Oct. 13, 1959     J. W. HOUSER     2,908,224
VARIABLE DELIVERY PRESSURE FLUID ENGINE
Filed Aug. 20, 1954     8 Sheets-Sheet 1

INVENTOR.
JOHN W. HOUSER
BY
ATTORNEYS

Oct. 13, 1959 J. W. HOUSER 2,908,224
VARIABLE DELIVERY PRESSURE FLUID ENGINE
Filed Aug. 20, 1954 8 Sheets-Sheet 2

INVENTOR.
JOHN W. HOUSER
BY
*D.C. Snyder*
*Roderick B. Jones*
ATTORNEYS

INVENTOR.
JOHN W. HOUSER
BY
ATTORNEYS

_United States Patent Office_

2,908,224
Patented Oct. 13, 1959

2,908,224

VARIABLE DELIVERY PRESSURE FLUID ENGINE

John W. Houser, Willow Grove, Pa.

Application August 20, 1954, Serial No. 451,323

18 Claims. (Cl. 103—120)

(Granted under Title 35, U.S. Code (1952), sec. 266)

The invention described herein may be manufactured and used by or for the Government of the United States of America for governmental purposes without the payment of any royalties thereon or therefor.

The present invention pertains to the art of pressure fluid engines, which includes the art of pumps, and the invention is particularly adapted for use in power pumps.

A pressure fluid engine that embodies the invention comprises a set of circular panels that are positioned face-to-face and spaced apart, and are rotatable in unison on axes that intersect. The face of each panel defines a plane, and the axis of rotation for each panel is concentric with and normal to the plane of its face. The space between opposed faces of the panels is enclosed in a container that extends around the peripheries of the panels. A plurality of partitions between opposed faces of the adjacent panels extend radially to the container, and they divide the space between opposed panel faces into a set of working chambers arranged circumferentially.

The angle between the axes of the several panels is variable, and this varies the angle between opposed faces of the panels. By the panels rotating in unison with opposed faces out of parallel relationship, a point on one face moves towards and away from its corresponding opposite point on the opposed face, once during each revolution, and volumetric values of the several working chambers are varied accordingly. The several working chambers in succession circumferentially pass each through a cycle of volumetric changes from a minimum to a maximum and back to a minimum, the complete cycle being a revolution.

An inlet port and an outlet port communicate with the several working chambers in succession, and are spaced apart circumferentially. One port is located where volumes of the chambers are in process of increasing, and the other where the volumes are diminishing.

For the pressure fluid engine to operate as a power pump, its exhaust is connected to a power system that demands fluid under pressure to perform its work. For example, the power system may include a fluid motor operable to raise or lower the landing wheels of an aircraft. The exhaust of the power pump is connected internally of the engine, through a suitable fluid passage or manifold, with the outlet port, which is located where volumetric values of the working chambers are decreasing. The intake of the pump is connected with an external source of fluid under a lower or nominal pressure, and internally of the engine is connected, also through a suitable fluid passage or manifold, with the inlet port that is located where volumetric values of the working chambers increase.

The pressure or power capacity of the pump may be varied in accordance with variable pressure requirements of the power system in which the pump is to be used. Adjusting mechanism may be provided to control the pressure output as needed progressively between a maximum, which is the rated capacity of the pump, and a minimum, which may be as low as no power output at all. The power capacity of the pump is controlled for any given service by varying the angular displacement between the axes of the several panels.

When the axes of the panels are in line with each other, the planes of opposed faces of adjacent panels are parallel, and rotation produces no volumetric change in the working chambers. Maximum or rated pressure output occurs when the axes of the several panels of the set are displaced to the maximum extent that the physical structure of the engine permits, which corresponds with maximum angular displacement between opposed faces of adjacent panels.

Dimensions of the engine as a power pump are selected for a volumetric capacity which is determined by the volumetric needs of the power system that is to be supplied by the pump. The pressure build-up of the pump, constituting the difference between exhaust pressure and the pressure of fluid at the intake, varies inversely with reference to the volumetric differential between maximum and minimum volumes of the working chambers, and is increased particularly by the minimum volume being diminished. In addition to dimensions of the pump being sufficient for the required volumetric capacity, a structure is adopted to attain a minimum volumetric value in the working chambers that is as low as possible, thereby to attain the maximum available pressure build-up.

In the specific structure of the disclosed embodiments, the set of panels comprises a pair of outboard panels with an inboard panel between them. The outboard panels are secured to each other spaced apart and face-to-face, with the planes of their several opposed faces held parallel to each other. By the inboard panel being positioned between the outboard panels, its opposite faces are positioned each opposed to the inboard face of one of the outboard panels. The disclosed structure thereby constitutes two pump units, located respectively on opposite sides of the inboard panel.

The outboard panels are rotatable on a common axis that passes through the centers of the inboard faces of both panels. The inboard panel is rotatable on an axis through its center that intersects the axis of the outboard panels at a point midway between the inboard faces of the outboard panels.

The structure of the set of panels constituting the several outboard and inboard panels constitutes a rotor that rotates in a stator that embodies the intake and exhaust, the inlet and outlet ports, and the connecting passages between the intake and inlet port and between the outlet port and exhaust.

More detailed understanding of the principles of the invention, and disclosure of several practical embodiments thereof, are contained in the accompanying drawings, in which.

A pressure fluid engine embodying the invention is disclosed in Figs. 1 to 11 inclusive, and it comprises a rotor 11, which rotates inside the stator 12.

Figures 1, 2, 5, 6:
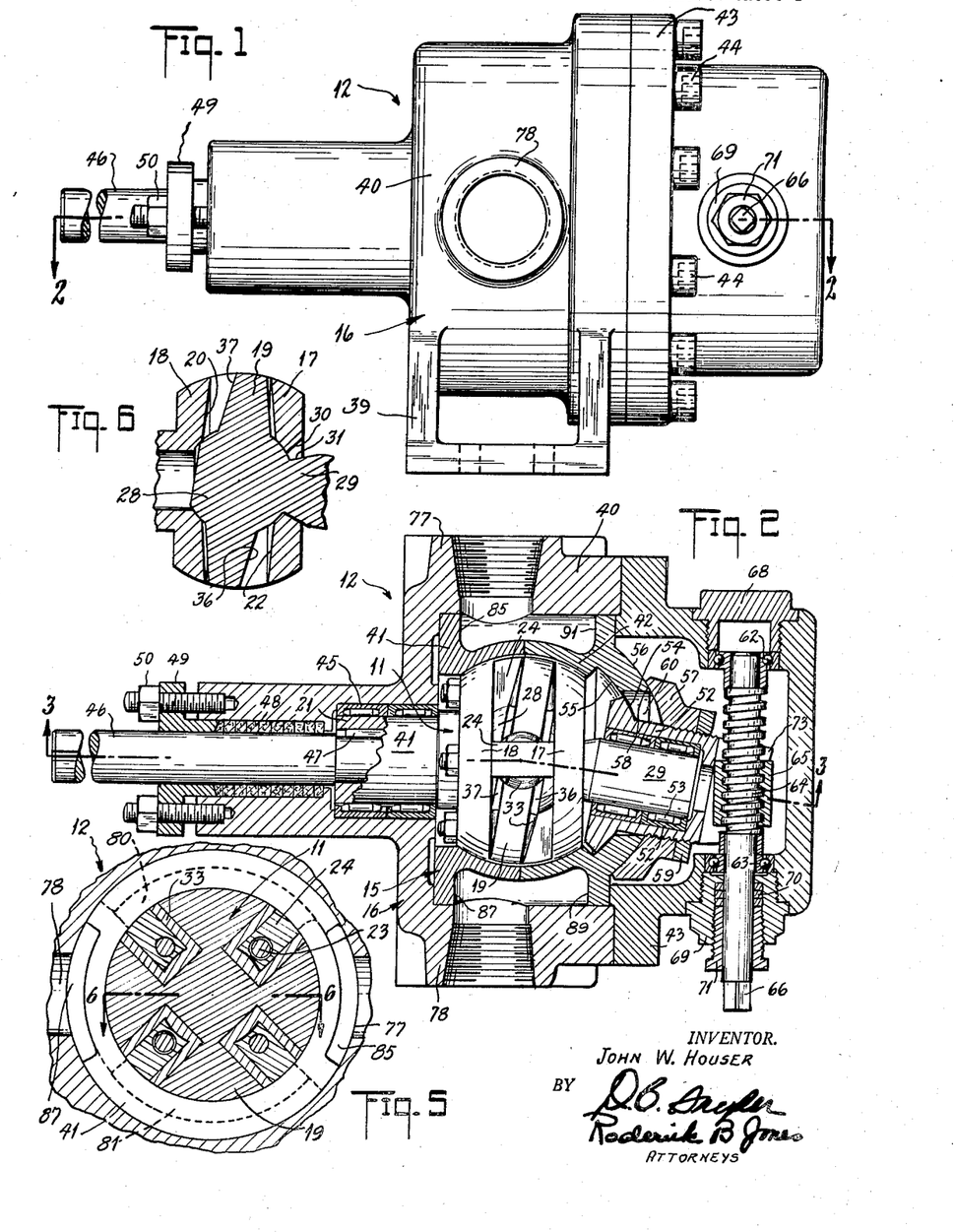
Fig. 1 is a side elevation of a power pump embodying the invention.
Fig. 2 is a cross-section in plan, taken on line 2—2 of Fig. 1.
Fig. 5 is a fragmentary cross-section similar to Fig. 4, with parts differently placed with reference to each other.
Fig. 6 is a cross-section, taken on line 6—6 of Fig. 5.
Figure 3:
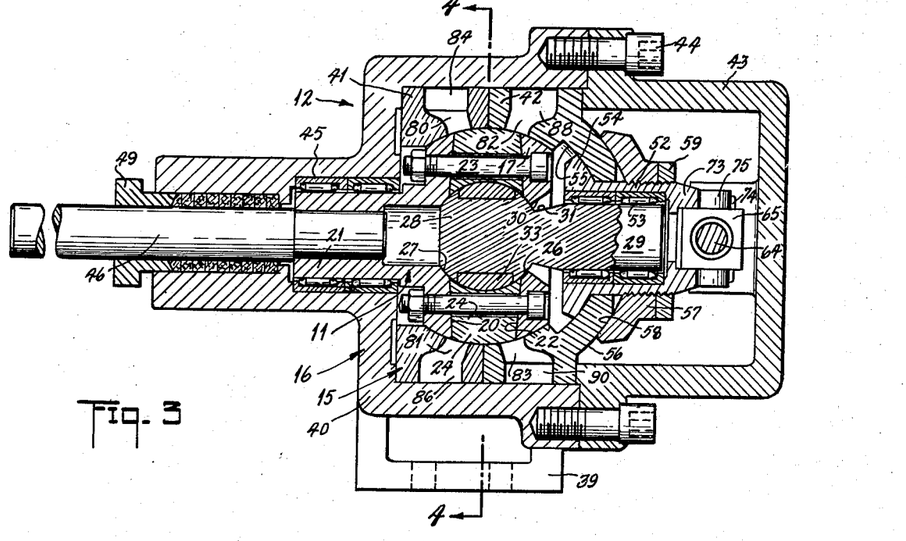
Fig. 3 is a cross-sectional elevation, taken on line 3—3 of Fig. 2.
Figure 4:
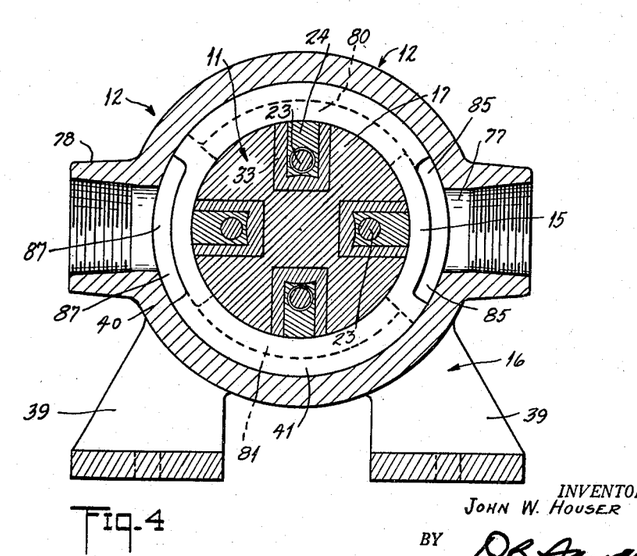
Fig. 4 is a cross-sectional elevation, taken on line 4—4 of Fig. 3.

Rotor 11, Figs. 2, 3 and 4, comprises adjacent circular panels. In the disclosed structure, one of the several adjacent panels comprises a pair of outboard panels 17 and 18, which are held spaced apart. The other of the adjacent panels is inboard panel 19, which is positioned in the space between the pair of outboard panels 17 and 18, and thereby is positioned adjacent to panel 17 at one of its sides or faces, and adjacent to the other outboard panel 18 at its other side. See Fig. 7 also.

Outboard panel 18 comprises an inboard face 20 that defines a plane. The other outboard panel 17 also comprises its inboard face 22, which also defines a plane. Bolts 23 are projected through the outboard panels 17 and 18, and each through a spacer member in the form of a segment 24 between the panels, the several spacer members serving to hold inboard faces 20 and 22 of respective outboard panels 18 and 17 face-to-face and their planes in parallel relationship. Shaft 21 is secured to panel 18, and is common to both outboard panels 17 and 18, the axis of the shaft being directed through the centers of the outboard panels and concentrically perpendicular to the planes of their several inboard faces 20 and 22.

Panel 17 comprises seat 26, Fig. 3, which is recessed into face 22 and is contoured spherical. Face 20 of panel 18 similarly comprises the recess of spherical seat 27, the several seats 26 and 27 being contoured spherical continuously on a center located on the axis of shaft 21 at the midpoint between the planes of inboard faces 22 and 20 when panel 17 is secured to panel 18 as described by means of bolts 23. The inner edges of spacer members 24 are contoured spherical to seat against spheroid 28. Seats 26 and 27, and spacer members 24 between them, constitute a spherical bearing surface or socket that contains spheroid 28. Shaft 29 is secured to spheroid 28, and is projected through the aperture of panel 17 that includes seat 26. The axis of shaft 29 is directed through the center of spheroid 28, where it intersects the axis of shaft 21 at a point midway between inboard faces 20 and 22 of respective outboard panels 18 and 17. See Fig. 7 also.

The aperture of panel 17 is bevelled at 30, Fig. 3, and shaft 29 comprises the annular undercut 31 adjacent to spheroid 28. See Fig. 2. Shaft 29 can be displaced angularly with reference to shaft 21 by spheroid 28 being rotated in the socket of seats 26 and 27, the magnitude of angular displacement being limited by undercut 31 of shaft 29 engaging bevel 30 of panel 17, as seen in Fig. 6.

Figure 7:
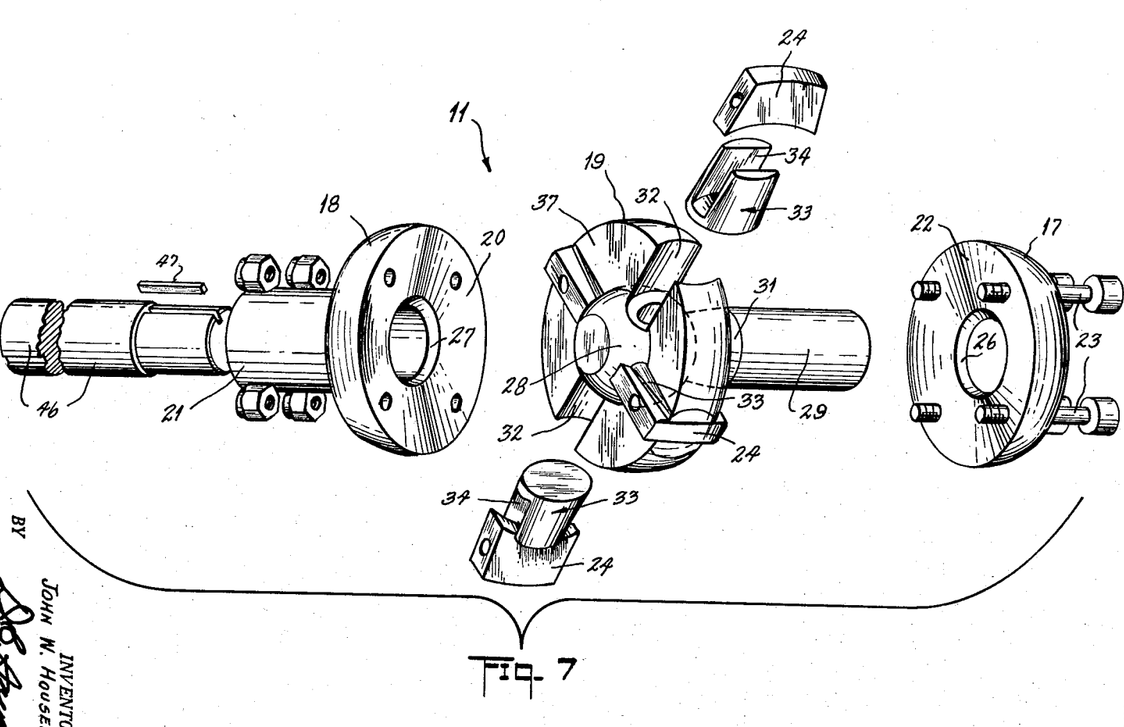
Fig. 7 is an exploded view with parts in perspective, showing the rotor of the pump in Fig. 1.

Inboard panel 19 is secured to spheroid 28 as seen in Fig. 7, with its center-plane perpendicular to the axis of shaft 29, and comprises opposite faces 36 and 37 defining parallel planes which are disposed symmetrically on opposite sides of the center-plane of panel 19. Inboard panel 19 positioned between parallel outboard panels 17 and 18 locates panels 19 and 17 adjacent to each other with their respective faces 36 and 22 opposed to each other, and locates panels 19 and 18 adjacent to each other with their respective faces 37 and 20 opposed to each other similarly. This provides spaces respectively at the left and right of inboard panel 19 in Fig. 2, and respectively between adjacent panels 18 and 19 and between adjacent panels 19 and 17, constituting pump units of the pressure fluid engine on respective opposite sides of the inboard panels. The center of center-plane of circular inboard panel 19 is located coincident with the center of spheroid 28, which coincides with the point of intersection between the several axes of shafts 21 and 29.

When shaft 29 is positioned coaxially in line with shaft 21, planes of respective opposite faces 36 and 37 of inboard panel 19 are positioned parallel with opposed face 22 of panel 17 and opposed face 20 of panel 18. When shaft 29 is displaced angularly with reference to shaft 21, opposed faces of the several pump units at the left and right of inboard panel 19, between opposed faces 20 and 37 of respective adjacent panels 18 and 19, and between opposed faces 36 and 22 of respective adjacent panels 19 and 17, are displaced angularly with reference to each other. The angles between opposed faces are equal, and are oppositely directed, as seen in Figs. 2 and 6.

Inboard panel 19 comprises the radially directed notches 32, Fig. 7, of which there are four in the disclosed embodiment, and these are spaced equi-distant circumferentially. Each notch contains one of the spacer members 24. Each of the spacer members or segments 24 extends in opposite directions away from the opposite faces 36 and 37 of inboard panel 19, and into abutting engagement at its respective opposite ends with faces 22 and 20 of respective panels 17 and 18. The several spacer members 24 are directed perpendicular to the planes of the several faces 22 of panel 17, and 20 of panel 18. The angle of each spacer member 24 relative to opposite faces 36 and 37 of inboard panel 19 varies during rotation of rotor 11 of the several axes of the angularly-displaced shafts 29 and 21, there being a complete cycle of angular changes between panel 19 and spacer members 24 during each revolution of the rotor.

Each spacer member 24 extends from its concavely spherical surface that fits and bears against the surface of spheroid 28 to the peripheries of panels 18, 19 and 17. Each spacer member 24 lies in a plane that is a radial plane of the assembly constituting the pair of outboard panels 18 and 17, and the several spacer members thereby form each a partition. The several partitions of spacer members 24 divide the spaces, between opposed faces 36 and 22 of respective adjacent panels 19 and 17, and between opposed faces 37 and 20 of respective adjacent panels 19 and 18, in each case into four working barrels distributed circumferentially. Each of the pump units, respectively at the left and right of inboard panel 19 in Fig. 2, consists of four working chambers, each defined circumferentially by two adjacent spacer members or partitions 24. The pump characteristics of the several pump units are same same, and each supplies half of the total volumetric capacity of the engine.

Each of the notches 32, Fig. 7, is contoured cylindrical on a radially directed axis through the center of spheroid 28, and constitutes a bearing for a pin 33 to rotate on its axis. Each pin 33 comprises its slot 34 constituting opposite bearing surfaces companion to opposite side surfaces of its corresponding spacer member 24, which slides relatively lengthwise of itself along the slot 34. With each revolution of rotor 11 on the several axes of the angularly-displaced shaft 21 and 29, each pin 33 slides to-and-fro along its corresponding partition of spacer member 24 between faces 22 and 20 of respective outboard panels 17 and 18. Because rotating inboard panel 19 travels along a path positioned at an angle to outboard panels 17 and 18 rotating in unison therewith, the relative movement of a partition 24 sliding along slot 34 of its corresponding pin 33 is accompanied by rotation of the pin, which makes a complete oscillation in its bearing 32 in the same time interval of a revolution of rotor 11.

By means of the described structure, parallel outboard panels 17 and 18 are keyed to the angularly-displaced inboard panel 19, and the several panels 18, 19 and 17 rotate in unison to constitute rotor 11, with outboard and inboard panels severally rotating on the axes of their respective shafts 21 and 29. All of the several working chambers of the engine are closed and sealed from each other by the described structure of the partitions 24 and their companion pins 33.

By the described operation, any point on the face 36 of inboard panel 19 moves towards and away from its correspondingly opposite point on opposed face 22 of outboard panel 17, once in the cycle of a revolution of rotor 11. Likewise, any point on face 37 of inboard panel 19 moves towards and away from its correspondingly opposite point on face 20 of outboard panel 18 in the same time interval. Volumetric values of the working chambers are varied accordingly. In the cycle of a revolution of rotor 11, a working chamber changes its volumetric value progressively from a minimum volume to a maximum volume, and back to the minimum volume.

The range of volumetric changes is the same in all working chambers. In the several pump units at the left and right of the inboard panel 19 in Fig. 2, the working chambers pass through their cycles of volumetric changes in succession circumferentially, according to the direction of rotation of rotor 11, through alternating half-revolution phases of increasing and decreasing volumetric values, the cycles in the two pump units being a half revolution out of phase with each other.

Stator 12 comprises housing 16, which contains working barrel 15 in which the working chambers of rotor 11 operate. Housing 16 rests on legs 39, Figs. 1, 3 and 4, and comprises the cavity member 40 into which the working barrel 15 fits and is inserted.

The inside surface of working barrel 15 is contoured concavely spherical. The outside surface of rotor 11, constituting the peripheral edges of panels 18, 19 and 17 with the outer edge surfaces of segments 24 continuous therewith, are contoured convexly to fit in the concavely spherical working barrel 15, and the rotor rotates therein. Working barrel 15 constitutes a container that closes the several working chambers of rotor 11 peripherally.

Working barrel 15 consists of two hemispherical half members, 41 and 42, Figs. 2 and 3. Half member 41 is inserted into the cavity of member 40 first. Rotor 11 then is inserted, and half member 42 follows to contain the rotor. Closure member 43 of housing 16 then is positioned against cavity member 40, and is secured in place by means of cap screws 44.

Cavity member 40 is extended to include the bearing 45 for shaft 21 of outboard panels 17 and 18. In the disclosed structure, shaft 21 is hollow, and drive shaft 46 is keyed thereto at 47. Rotor 11 is rotated inside working barrel 15 by drive shaft 46 being driven from any suitable power source, not shown. Packing 48 to confine lubricant is tightened around drive shaft 46 by means of packing closure 49 and screws 50, Fig. 2.

Shaft 29 is contained in sleeve 52 that embodies the bearing 53 for the shaft. Sleeve 52 comprises a head, the surface 54 of which is convexly spherical. Concavely spherical surface 55 of half member 42 is companion to and bears against the convex surface 54 of sleeve 52. The half member 42 comprises the convexly spherical surface 56 also, which is concentric with surface 55, and which is companion to and bears against the concavely spherical surface 58 of nut 57. Nut 57 is threaded onto sleeve 52, and holds companion surfaces 54 and 55, of sleeve 52 and half member 52 respectively, in correct bearing engagement, as also companion surfaces 56 and 58 of half member 42 and nut 57 respectively. Lock nut 59 holds nut 57 secure.

Bearing surfaces 55 and 56 of half member 42 form a dome which comprises aperture 60 through which sleeve 52 containing shaft 29 projects. Aperture 60 is a slot, and it is extended horizontally to a length that enables shaft 29 to be displaced angularly with reference to shaft 21 to the maximum desired extent as determined by undercut 31 of shaft 29 engaging bevel 30 of panel 17, as seen in Fig. 6. The width of slot 60 is determined to engage sleeve 52 and form a guideway for shaft 29 during its angular displacement with reference to shaft 21. See Fig. 9 also.

Closure member 43 of housing 16 comprises the bearings 62 and 63 for respective opposite ends of traverse screw 64, on which traverse nut 65 is threaded. Traverse screw 64 comprises the squared end 66 that extends to the outside of closure member 43 to receive a suitable wrench, not shown, and by means of which screw 64 is rotated to traverse nut 65 along its length.

Closure member 43 comprises nut 68 for confining lubricant, which can be removed to inspect and service bearing 62 at one end of traverse screw 64. Bearing 63 at the opposite end of traverse screw 64 may be inspected and serviced by removing nut 69. Packing 70 in nut 69 confines lubricant at the other end of screw 64, and is tightened around screw 64 by means of packing nut 71.

Figures 8, 9, 10, 11:
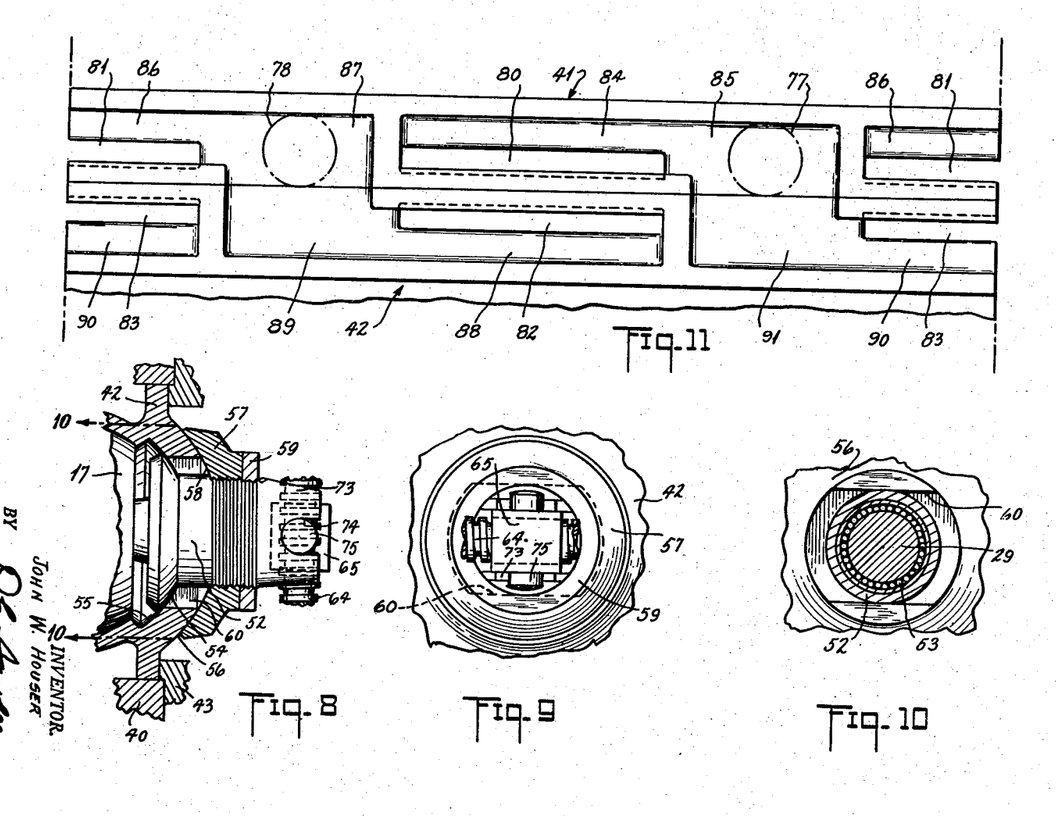
Fig. 8 is a fragmentary cross-section in plan, showing parts of Fig. 2 differently placed with reference to each other.
Fig. 9 is an end elevation, viewed from the right of Fig. 8.
Fig. 10 is a cross-section, taken on line 10—10 of Fig. 8.
Fig. 11 is a developed view of the working barrel, viewing the arrangement of ports from the exterior.

Sleeve 52 comprises the ears 73 that project away from its end to straddle and engage traverse nut 65 as seen in Figs. 2, 8 and 9. Ears 73 comprise notches 74, which are engaged by respective pins 75 projected oppositely from nut 65. When traverse screw 64 is rotated by means of a wrench applied to squared end 66, nut 65 is traversed along the screw, thereby displacing shaft 29 to vary the angle between the axes of shafts 21 and 29 as desired. The angle between inboard panel 19 and the several parallel panels 17 and 18 is varied thereby to adjust the pressure output of the engine operating as a pump. Figs. 2 and 6 illustrate the adjustment of maximum pressure capacity.

As a power pump, the pressure fluid engine of the present invention receives fluid through intake 77 from any suitable source of fluid under relatively low or nominal pressure. Operation of the pump is to subject this fluid to a higher working pressure, and to feed it in pressurized condition to a power system that requires pressurized fluid for its operation under the working pressure of the pump. By way of specific example, the pump of the present invention may be used to drive one or more pressure fluid motors.

Intake 77 and exhaust 78 are standard pipe connections, and are alike. The whole engine is symmetrically the same on opposite sides of its center, enabling rotor 11 to be driven alternatively in either of opposite directions depending upon the needs of a given installation, connections 77 and 78 to be used interchangeably for intake or exhaust, and power output to be adjusted, from no pressure differential between exhaust and intake coincident with shaft 29 being coaxially in line with shaft 21, to the desired pressure output by nut 65 being traversed along screw 64 in the appropriate of alternative directions in either of opposite directions.

Connection 77 is designated the intake by way of assumption as a means to make clear the pump characteristics of the engine, and rotor 11 is driven in the counterclockwise direction when viewed from the left in Figs. 2 and 3. Rotation is clockwise in Figs. 4 and 5. Connection 78 is the exhaust. This means, with reference to Fig. 2, that rotor 11 is moving in its upwardly direction on the near or viewer side of the figure, and is moving downwardly on the remote or hidden side, this being so of both pump units at the left and right respectively of inboard panel 19.

Of the pump unit at the left of inboard panel 19 in Fig. 2, it will be observed that working chambers are in the increasing phase of the cycle of their volumetric changes on the near side, and on the remote side the working chambers of the same pump unit are in the decreasing phase of their volumetric changes. In the pump unit at the right of inboard panel 19, working chambers are in their increasing phase of volumetric changes on the remote side, and are in their diminishing phase on the near or viewer's side. This is coincidental with the two pump units being 180° out of phase with each other, as explained hereinbefore.

Each pump unit has an inlet port, and an outlet port, and these in the disclosed embodiment are in the working barrel 15. In the pump unit at the left of inboard panel 19 in Fig. 2, and also in Fig. 3, the inlet port 80 is at the top in Fig. 3, and the outlet port 81 is at the bottom. The inlet port 83 of the pump unit at the right is at the bottom in Fig. 3, and the outlet port 82 is at the top. For the pump unit at the left of inboard panel 19 in Fig. 3, inlet and outlet ports 80 and 81 respectively are in the half member 41 of working barrel 15, and outlet and inlet ports 82 and 83 respectively of the pump unit at the right are in half member 42. See Fig. 11 also.

The manifold structure of the presently considered engine is embodied in working barrel 15, and is illustrated in Fig. 11, which views the outer periphery of the working barrel developed. Annular passage 84, constituting a channel along the peripheral surface of half member 41, extends from the inlet port 80 to cross passage 85. In half member 42, a similar annular channel 90 extends from inlet port 83 to cross passage 91, which is continuous with cross passage 85 along the peripheral surface of working barrel 15, at a position where intake 77 is located. Fluid received through intake 77 is distributed in opposite directions along annular passages 84 and 90 to the working chambers of the pump units at the left and right respectively of inboard panel 19 in Figs. 2 and 3, through their respective inlet ports 80 and 83.

Similarly, annular passage 86 along the peripheral surface of half member 41, and the similar annular passage 88 of half member 42, connect their respective outlet ports 81 and 82 with their respective cross passages 87 and 89, which are continuous with each other along the peripheral surface of working barrel 15, and are located at the exhaust 78. Fluid that has been pressurized in the several pump units at the left and right of inboard panel 19 in Figs. 2 and 3 is driven out of their respective outlet ports 81 and 82, and through their respective annular passages 86 and 88, to the exhaust 78, which delivers the fluid under pressure.

Fig. 5 discloses the pumping action of the pump unit at the left of inboard panel 19 in Figs. 2 and 3, and illustrates the valving action by the inlet and outlet ports, 80 and 81 respectively, operating on the several working chambers as they pass in succession.

The working chamber at the uppermost position in Fig. 5, extending between adjacent partitions 24, is in the process of increasing its volume, and it is taking in fluid from intake 77 through its inlet port 80. The working chamber at the lowermost position in the figure is diminishing its volumetric value, and is discharging the fluid it has subjected to pressure through the outlet port 81, which fluid in pressurized condition is driven out of exhaust 78.

With reference to the working chambers at the right and left in Fig. 5, it will be observed that each of these is completely closed. Clockwise rotation being assumed, the trailing partition 24 of each, upper at the right and lower at the left, has just moved beyond a port, these being inlet port 80 in the case of the working chamber at the right, and outlet port 81 in the case of the working chamber at the left. At the same time, the leading partition 24 of each of these working chambers is moving into position to open its next port, these being outlet port 81 in the case of the working chamber at the right, and in the case of the working chamber at the left the inlet port 80.

In the pump unit at the right of inboard panel 19 in Figs. 2 and 3, the structure is symmetrically the same as at the left, except that the inlet port is at the lowermost position in the engine, and the outlet port is at the uppermost position. See Fig. 11. All the ports, 80, 81, 82, and 83, are the same length and extend to like angular distances; also all distances between near ends of adjacent ports circumferentially are the same. In the several pump units at the left and right of inboard panel 19, Fig. 3, adjacent ports in the adjacent half members 41 and 42, consisting of the inlet and outlet ports 80 and 82 respectively, and the inlet and otulet ports 81 and 83 respectively, are coextensive circumferentially. The valving action of the inlet and outlet ports in both pumping units is the same, and as described hereinbefore.

In the position of rotor 11 seen in Fig. 4, there are two circumferentially adjacent working chambers that are receiving fluid through inlet port 80, and these are in the phase of volumetric increase. The other two working chambers are open to outlet port 81, and are in their phase of volumetric decrease. This condition continues during the succeeding 45° angle of rotation of rotor 11, until the position of Fig. 5 is reached. Now, two of the four working chambers are completely closed, and they continue to be closed during a diminutive portion only of a complete revolution of rotor 11. A working chamber remains closed only long enough to prevent fluid flow through the working chamber as a passage from a high-pressure port 81 or 82 to the respective low-pressure port 80 or 83. The lengths of the several ports 80, 81, 82 and 83 are determined accordingly.

In Fig. 2, the working chambers are closed at their uppermost and lowermost positions in the figure. And these are the positions of direction change of changing volumetric values. In the pump units at the left and right of inboard panel 19 in Fig. 2, direction change towards and away from absolute maximum is at the uppermost and lowermost positions respectively, and direction change towards and away from absolute minimum is at the lowermost and uppermost positions respectively.

It will be observed in Fig. 2, that travel of inboard panel 19 away from surface 22 of outboard panel 17 towards surface 20 of outboard panel 18 and back towards surface 22, once during each revolution of rotor 11, is at a lesser rate with reference to the uniform rate of angular displacement near the uppermost and lowermost positions than at the midpoint where panel 19 crosses the crown of spheroid 28. During a distance of angular travel when a working chamber is closed, the total magnitude of its volumetric change is less than during any other like angular displacement of its complete cycle, and the pressure change of fluid inside a closed working chamber is insufficient to be critical. A pressure chamber in its phase of volumetric increase is drawing fluid through its inlet port 80 or 83 from intake 77 during virtually a complete half-revolution, and during virtually the entire other half-revolution, constituting its phase of volumetric decrease, the working chamber is pouring pressurized fluid to exhaust 78 through its outlet port 81 or 82.

As has been observed hereinbefore, the power capacity of the engine as a pump is determined by the pressure build-up in the pump, constituting the pressure differential between the exhaust and intake, 78 and 77 respectively, varies inversely with the maximum and minimum volumes attained by the several working chambers. To attain a pressure build-up that is relatively high, a minimum volumetric value is desired that is as low as possible. For this purpose, faces 22 and 20 of respective outboard panels 17 and 18 are made frusto-conical, and opposite faces 36 and 37 of inboard panel 19 also are made frusto-conical. This is seen in Fig. 6, as also in Figs. 2 and 3.

The conical angle of the several faces 22 and 20 of respective outboard panels 17 and 18 is the same, and the conical angle of opposite faces 36 and 37 of inboard panel 19 are the same. At the adjustment of maximum or rated power output of the pump, determined by the position of traverse nut 65 along screw 64 that is seen in Fig. 2, when undercut 31 of shaft 29 abuts against bevel 30 of panel 17 as seen in Fig. 6, the opposed faces 20 and 37 of respective panels 18 and 19, as also opposed faces 36 and 22 of respective panels 19 and 17, are closely adjacent to each other and parallel at circumferential positions of minimum volume, which are opposite each other in a diametrical plane. This is so of the pump unit at the left of inboard panel 19 at the lowermost position in Fig. 6, and at the uppermost position in the pump unit at the right. Rotor 11 is constructed for face 37 of inboard panel 19 to approach its opposed face 20 of outboard panel 18 as near as possible without touching, and similarly for face 36 of panel 19 to approach its opposed face 22 of panel 17 as near as possible without touching.

None of the faces 20, 37, 36 and 22 of several panels 18, 19 and 17 describes a plane. Each defines a plane at the base of its cone, and several parallel planes along its conical axis. The ends of the partition members 24 are bevelled, as seen in Fig. 3, to fit the conical surfaces 22 and 20 of respective outboard panels 17 and 18.

Attention is directed now to Figs. 4 and 5, and particularly to the bolts 23, which hold rotor 11 in assembled condition. In the case of each of two oppositely positioned bolts 23, the bore of spacer member 24 through which it passes is enlarged, whereas the bores of the other two partition members 24 are sized to fit their bolts 23. This structure enables those alternate partition members 24 which have the oversized bores to move circumferential relative to their respective bolts 23, and each to move individually relative to its next adjacent spacer member or partition on both sides. This causes volumetric changes in the working chambers in response to relative circumferentially movement between their containing partitions 24, but these volumetric changes are slight and have no appreciable practical effect on the pumping characteristics of the engine.

Freedom of relative circumferential movement between adjacent spacer member 24 is provided for operability of the engine, and this is enabled by the oversized bores in alternate partition members. Otherwise rotor 11 would be caused to bind, and its rotation would be prevented. The described relative circumferential movement between next adjacent spacer members 24 is a mechanical peculiarity of the engine, for which the described freedom is provided consisting of next adjacent spacer members being movable relatively towards and away from each other. In the embodiment of Figs. 1 to 11 inclusive, the described oversized bolt holes for bolts 23 is the means that is provided for the purpose.

To understand the need, consider a peripheral point on inboard panel 19 that coincides with the axis of a radial pin 33. Near the panels 17 and 18, the radial distance of this point from the axis of shaft 21 is less than at a position midway between the outboard panels 17 and 18 where the point crosses the crown of spheroid 28. Therefore, the linear rate of circumferential travel of this point with reference to the axis of shaft 21 is less near the panels 17 and 18. As each such peripheral point on the axis of a pin 33 approaches towards either face 22 or 20 of respective outboard panels 17 and 18, its linear rate of travel circumferentially with reference to the axis of shaft 21 diminishes, and the rate increases progressively as the point moves away from either face 22 or 20 of respective panels 17 and 18 towards the crown of spheroid 28, where its linear rate of travel is maximum.

As the result of the described deceleration and acceleration, a pin 33 and its corresponding segment 24 alternately approaches the next trailing segment circumferentially while it recedes from its next segment in advance, and recedes from its next trailing segment while it approaches its next preceding segment. This circumferential movement of a spacer member 24 relative to its neighbor is coordinated with its lengthwise travel in bearing slot 34 of its corresponding radial pin 33, and with the pin rotating on its axis.

In the structure of the embodiment of Figs. 1 to 11, the opposite bolts 23 of closely fitting bores of their spacer members 24 as seen in Figs. 4 and 5 are tightened to secure the assembly of rotor 11 rigidly and hold outboard panels 17 and 18 rigidly parallel. The other two opposite bolts 23 in oversized bores of spacer members 24 are secured less tightly to permit movement of their spacer members 24 circumferentially to whatever extent is needed to accommodate the described relative circumferential displacement between adjacent partitions 24.

Another and different embodiment of the invention is disclosed in Figs. 12 to 22 inclusive. Its principles are the same as already described. In the modified structure, rotor 95, Figs. 13 and 14, rotates in stator 96.

Stator 96 constitutes a housing consisting of two half members 97 and 98, which are secured to each other along their mid-plane flanges 99 by means of bolts 100. Half member 97 comprises a bracket 101, by means of which the engine can be secured to a support, and which may embody any suitable structure to adapt the bracket to the given standard of the support.

Shaft 103 is rotatable in the bearing 104 of half member 97, and at its other end in bearing 105 of half member 98. A keying device 106 of shaft 103 enables a driving shaft to be attached, the driving shaft being not shown, by means of which rotor 95 is rotated from any suitable power source, not shown. Ball bearing 107 is provided to hold shaft 103 against lengthwise travel in its bearings 104 and 105, and operates to inhibit chatter at high-speed rotation.

Cylinder 108 is secured to half members 97 and 98, by means of cap screws 109. Cylinder 108 contains pistons 110 and 111, which are backed both by a pressure fluid supplied through respective connections 112 and 113 from a suitable source, and under control of suitable valve mechanism, which is not shown.

Pistons 110 and 111 are positioned at respective opposite ends of cylinder 108 in opposed relationship, with roller follower 114 between their heads. A pressure differential between the fluids behind the several pistons 110 and 111 operates to actuate the pistons along the cylinder 108 in the direction away from the higher pressure, and follower roller 114, with arm 115 that carries the roller, is moved accordingly away from its mid-position. In the practical application of the invention disclosed in the embodiment of Figs. 12 to 22, the valve mechanism is operable alternatively to a higher pressure behind piston 111 or to a balance of pressure behind the two pistons 110 and 111. Accordingly, by means of higher pressure behind piston 111 arm 115 is actuated to the left into the position seen in Fig. 13, or alternatively arm 115 is returned to the right into its mid-position seen in Fig. 14, where it is positioned and held by a balance of pressure differential behind the several pistons 110 and 111.

The housing of half members 97 and 98 is sealed to confine a fluid lubricant, which can be supplied through the apertures of plugs 116. Packing ring 118 seals the housing 97, 98 at bearing 104, and is held in place by retaining plate 119, which is secured by means of cap screws 120. Nut 121 secures shaft 103 to ball bearing 107, and is held by lock washer 122. Closure plate 123, secured by cap screws 124, seals the housing 97, 98 at the bearings 105 and 107.

Spheroid 126 is secured to shaft 103 by means of spline 127 or the like suitable means, and carries panel 128, which is positioned with its center-plane coincident with the center of the spheroid and located at right angles to the axis of shaft 103. Opposite faces 129 and 130 of panel 128 are parallel, and are symmetrical on opposite sides of the center-plane of the panel. Faces 129 and 130 are perpendicular to the axis of shaft 103.

Panel 128 is positioned inside container 131, which consists of the pair of outboard panel members 132 and 133, annular spacer ring 134 between the outboard panel members, and bolts 135 that assemble the container and secure the outboard panel members and spacer ring to each other. Panel 132 comprises seat 136, which is concavely spherical to fit spheroid 126, and panel 133 similarly comprises the concavely spherical seat 137, which is continuous with seat 136 and with it forms a socket or bearing for the spheroid 126, enabling container 131 to be rotated on the center of the spheroid.

Panel 132 comprises the face 138, which is positioned opposed to the face 129 of inboard panel 128. Similarly, panel 133 comprises face 139, which is positioned opposed to face 130 of inboard panel 128. See Fig. 16 also. The space between opposed faces 138 and 129 of respective outboard and inboard panels 132 and 128, and the space between opposed faces 130 and 139 of respective inboard and outboard panels 128 and 133, constitute each a pump unit to the left and right respectively of inboard panel 128 in Figs. 13 and 14, each pump unit supplying half of the total volumetric capacity of the pressure fluid engine constituting the embodiment of Figs. 12 to 22.

Figure 13:
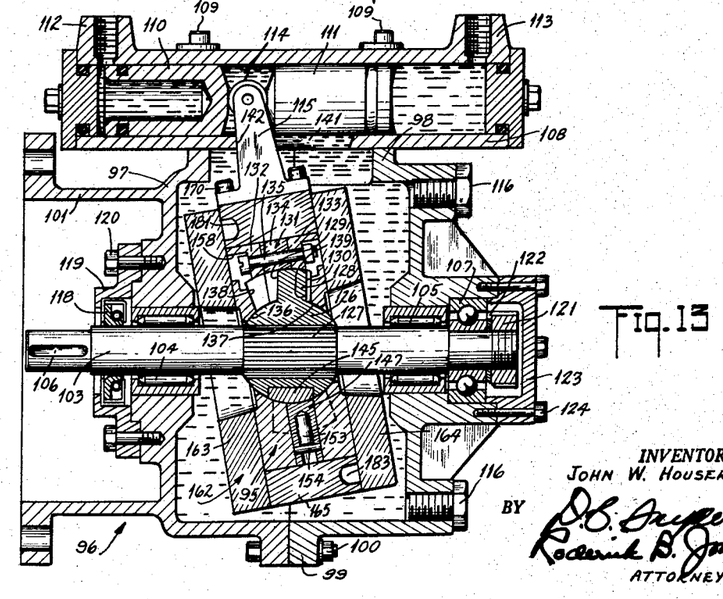
Fig. 13 is a cross-sectional elevation, taken on line 13—13 of Fig. 12.

Arm 115, impelled to the left or right alternatively by operation of pistons 110 and 111 in the manner described hereinbefore, and operating through a structure to be described hereinafter, displaces container 131 angularly on the center of spheroid 126 as a bearing to the positions of Figs. 13 and 14 alternatively. In the position of Fig. 13, the axis of container 131 has been displaced to an angle through the center of spheroid 126 with reference to the axis of shaft 103. Opposed faces 138 and 129 of respective outboard and inboard panels 132 and 128 thereby have been displaced angularly, as also opposed faces 130 and 139 of respective inboard and outboard panels 128 and 133. The angles between opposed faces 138 and 129, and between opposed faces 130 and 139, are the same but oppositely directed.

Figure 14:
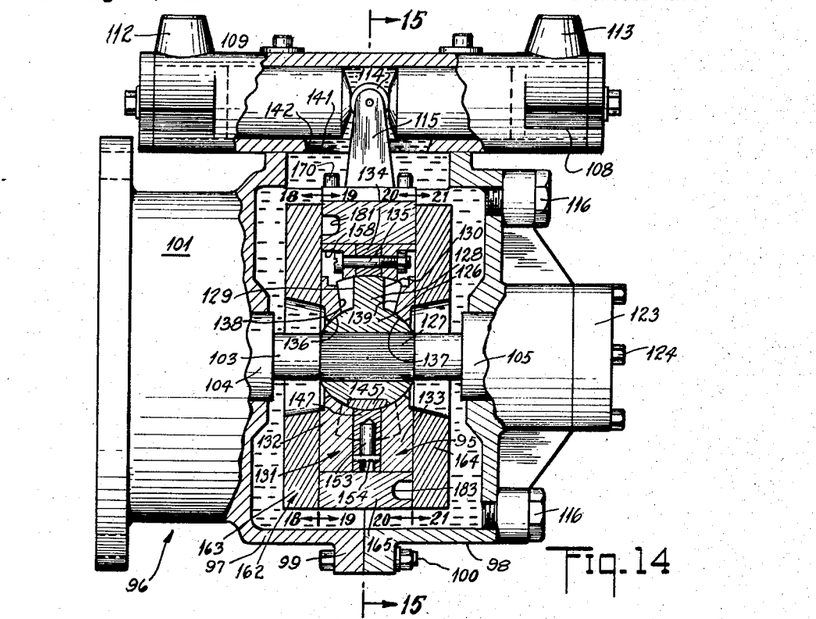
Fig. 14 is a side elevation viewed from the left in Fig. 12, with parts broken away and partly in section, to show the interior of the pump with parts located with reference to each other differently than in Fig. 13.
Figure 15:
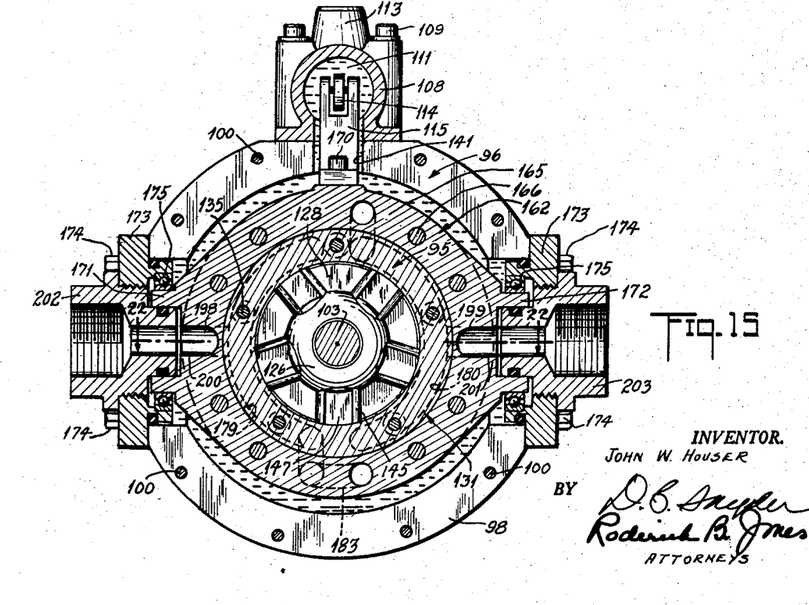
Fig. 15 is a cross-sectional elevation, taken on line 15—15 of Fig. 14.

By its movement when actuated by pistons 110 and 111 as described, arm 115 travels in slot 141 of cylinder 108, Figs. 13, 14 and 15, and this movement is limited by arm 115 engaging the end 142 of slot 141, which constitutes a stop.

Faces 138 and 139 of respective outboard panels 132 and 133 are contoured frusto-conical, as seen in Figs. 13 and 14. When arm 115 abuts against stop 142, at the uppermost position in Fig. 13, in the pump unit at the right of inboard panel 128, face 139 of outboard panel 133 has moved to a position closely adjacent to face 130 of inboard panel 128, and in parallel relationship along a radial plane of shaft 103. Similarly, in the pump unit at the left of inboard panel 128, face 138 of outboard panel 132 has moved to a position closely adjacent to face 129 of inboard panel 128 at the lowermost position in the figure, and the opposed faces are parallel to each other in a line along the radial plane of shaft 103. The conical angle of frusto-conical faces 138 and 139 of respective panels 132 and 133 is established accordingly, and is the same in the two faces 138 and 139.

Figure 16:
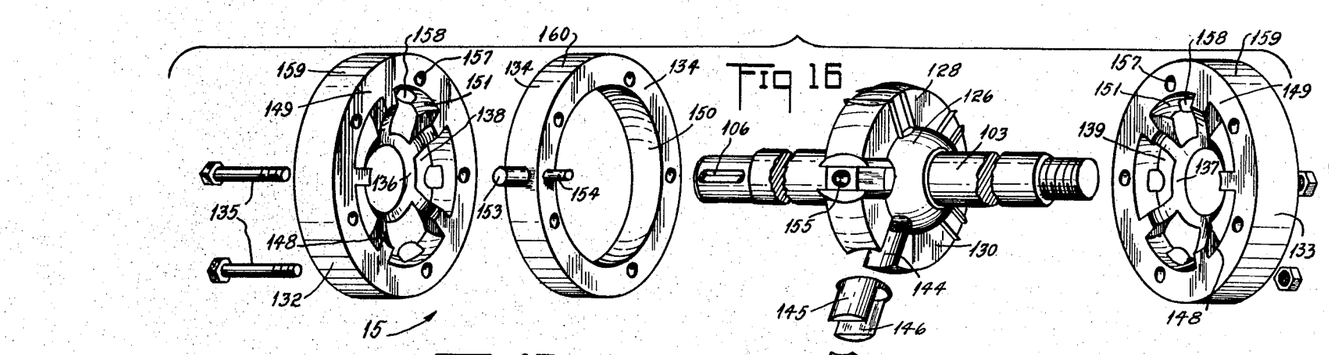
Fig. 16 is an exploded view with parts in perspective, showing the rotor.

Inboard panel 128 comprises radial notches 144, Fig. 16, which are equi-distant circumferentially. Notches 144 are cylindrical, and each constitutes a bearing for a radial pin 145, which contains a slot 146 that fits segment 147 for bearing engagement therewith. There are five radial notches 144 in the embodiment of Figs. 12 to 22, and five companion pins 145 and segments 147. The pump unit on each of opposite sides of inboard panel 128 is divided into five working chambers distributed circumferentially.

The inboard face of outboard panel 132 is recessed as seen in Fig. 16, to constitute the frusto-conical face 138 of the pump unit at the left of inboard panel 128 in Figs. 13 and 14, and the inboard face of the other outboard panel 133 is recessed similarly to constitute the frusto-conical face 139 of the other pump unit. Each outboard panel 132 and 133 is divided equi-distant circumferentially by five radially directed partition members 148 that project towards each other away from frusto-conical faces 138 and 139. The five partition members 148 of each outboard panel 132 or 133 correspond with each other in the several outboard panels, and correspond with the respective five segments 147 of inboard panel 128.

In the radial direction, the several partition members 148 extend each from the spherical seat 136 or 137 to the rim 149 of its panel 132 or 133, respectively. In each outboard panel 132 and 133, and in spacer ring 134 between them, opposite faces are parallel and flat. Rims 149 embody flat inboard faces of the several outboard panels 132 and 133, each defining a plane into which respective faces 138 and 139 are recessed. Flat rims 149 bear against respective opposite faces of annular spacer ring 134, and the several panels are held in assembly by means of bolts 135, see Figs. 13 and 14.

The inside annular surface 150 of spacer ring 134 is contoured concavely spherical, and the peripheral surface of inboard panel 128, with pins 145 and segments 147 continuously therewith, are contoured convexly spherical to fit in and bear against the concave annular surface 150 of spacer ring 134. Inside rims 149 of the several outboard panels 132 and 133, surfaces 151 extend to their respective corresponding surfaces 138 and 139 continuously with annular surface 150 of spacer ring 134, but are somewhat oversized for clearance. The several surfaces 151 provide the outer peripheral containing walls or partitions for the several working chambers of a pump unit, and in the several working chambers spheroid 126, against which spherical surfaces 136 and 137 bear, constitutes the inner containing wall opposite outer surfaces 151.

Opposite faces 129 and 130 of inboard panel 128 respectively constitute containing walls or surfaces of the working chambers of the several pump units, to which respective faces 138 and 139 of the several outboard panels 132 and 133 are opposite, the several segments 147 also constituting containing walls for the several working chambers, continually with their respective corresponding partition members 148 of the several outboard panels. With spheroid 126 and inboard panel 128 contained in container 131, the two are keyed to each other to rotate in unison and constitute rotor 95. Radial pin 153, which projects through annular ring 134 into bore 155 of one of the segments 147, Figs. 13 and 14, and is held in place by transverse locking pin 154, operates to key outboard panels 132 and 133 to inboard panel 128 for their rotation in unison.

Assuming clockwise rotation of shaft 103 viewed from the left in Fig. 13, in the pump unit at the right of inboard panel 128 in Fig. 13 the several working chambers in succession pass through their phase of increasing volumetric values on the near or viewer's side of the figure. At the same time, the working chambers of the pump unit at the left pass through their phase of increasing volumetric values on the remote or hidden side of Fig. 13, and pass through their phase of decreasing volumetric values on the near or viewer's side. The working chambers of the pump unit at the right pass through their phase of decreasing volumetric values on the hidden side of Fig. 13.

As in the case of the embodiment of Figs. 1 to 11, there is relative circumferential movement between adjacent segments 147 towards and away from each other, and for the same reason. Because container 131 of outboard panels 132 and 133 and inboard panel 128 rotate in unison on different axes that are angularly displaced with reference to each other, the rate of linear travel circumferentially of a peripheral point on inboard panel 128 that coincides with the axis of a pin 145 decreases progressively as it approaches an outboard panel 132 or 133, and increases progressively as it recedes away from an outboard panel, due to the radius of this point varying constantly in this rotation on the axis of container 131. See Fig. 13.

In the embodiment of Figs. 1 to 11 as described hereinbefore, and as seen in Figs. 4 and 5, holes for bolts 23 are oversized in circumferentially alternate partitions 24 are to meet the mechanical peculiarity of next adjacent partitions oscillating relatively towards and away from each other in time with the cycle of a revolution. To meet the same mechanical peculiarity in the embodiment of Figs. 12 to 22, partition members 148 of outboard panels 132 and 133 are narrower circumferentially than the slots 146 of their corresponding radial pins 145 of inboard panel 128, and also narrower than segments 147 which fit in the slots. This permits relative circumferential displacement between circumferentially adjacent segments 147, and also between each segment 147 and its corresponding partition members 148 of both outboard panels 132 and 133, allowing adjacent segments 147 to move relatively towards and away from each other to the extent that is necessary under the described circumstances. The described structure of only one pin 153 keying panel 128 to its container 131, at one point only circumferentially, enables the described relative movement between next adjacent segments 147.

Each partition member 148 of an outboard panel 132 projecting away from the frusto-conical face 138 engages its corresponding segment 147 at one of the end faces thereof, the opposite end face of the segment engaging the corresponding partition member 148 of the other outboard panel 133 in a like manner in the plane of rim 149 thereof. The length of each segment 147 corresponds with the thickness of annular spacer ring 134, and its opposite end faces bear in sliding engagement against respective end faces of corresponding partition members 148 in relative circumferential displacement.

When the pump is adjusted to the position of Fig. 13 by means of pistons 110 and 111, and rotor 95 is rotated under drive of shaft 103, at any radial pin 145 panel 128 travels in a complete revolution from adjacent to face 139 of one outboard panel 133 towards and adjacent to face 138 of the other outboard panel 132 and back to adjacency with face 139 of the first panel 133. Each radial pin 145 slides along its corresponding segment 147, which is long enough never to come out of engagement with its corresponding slot 146 of pin 145. In the cycle of the same revolution, each pin 145 also makes one complete oscillation on the axis of its bearing 144 of inboard panel 128, the extent of this rotation being determined by the angle of displacement between inboard panel 128 and outboard panels 132 and 133 that is determined by the adjustment of pistons 110 and 111. Also during the cycle of the same revolution of shaft 103, all segments 147 except the one which is keyed to container 131 by means of its pin 153 are displaced circumferentially relative to their respective corresponding partition members 148 of both outboard panels 132 and 133, and this enables coincident relative circumferential movement between each of next adjacent segments 147.

Each of corresponding partition members 148 in the several outboard panels 132 and 133, with their corresponding segment 147 between them, constitutes a partition extending through inboard panel 128 which serves correspondingly opposite working chambers of both engine units. This partition extends from face to face of frusto-conical faces 138 and 139 of the several outboard panels 132 and 133, similar to partition 24 in the embodiment of Figs. 1 to 11. In the case of one or the other of the two engine units, a partition between circumferentially adjacent working chambers consists of a partition member 148 continuous with its corresponding segment 147, the length of the partition varying according to volumetric changes in the working chambers that it separates. While a face 129 or 130 of inboard panel 128 is moving away from its opposed face 138 or 139 respectively, of respective outboard panels 132 or 133, the partition of partition member 148 increasing in length to compensate for the added distance between the opposed faces, and the corresponding segment 147 sliding in its slot 146 provides the added length as needed. At the same time, the corresponding partition of the other engine unit, embodying corresponding partition member 148, decreases in length, the compensation for length decrease being provided again by the corresponding segment 147 sliding along its slot 146.

Bores 157 of the several outboard panels 132 and 133, Figs. 13 and 14, that contain the bolts 135 lie on a circle concentric with container 131, and in the rims 149 of the several outboard panels are located circumferentially each about midway between adjacent partition members 148 that define the several working chambers circumferentially. Each bore 157 is counterbored at 158 into the outboard face of its panel 132 or 133, to contain the head and nut at respective opposite ends of the bolt 135 embedded within the exterior contour of rotor 95. Each counterbore extends laterally, and also to a depth, to penetrate into its corresponding working chamber, as seen in Fig. 16, and thus constitutes a passage for fluid flowing into and out of the working chamber.

In its phase of increasing volumetric change, a working chamber defined by adjacent partition members 148 draws fluid into itself through the passage of its counterbore 158, and it pressurizes the fluid during its phase of decreasing volumetric change, at the same time ejecting the fluid through the same passage of the counterbore 158. As previously described with reference to the embodiment of Figs. 1 to 11, the phases of increasing and decreasing volumetric changes continue each for a half revolution, minus a diminutive portion of a complete revolution between phases when a working chamber is completely closed, a working chamber being closed at the time of direction change of volumetric change from the increasing to the decreasing phase of its cycle, and from the decreasing to the increasing phase.

Exteriorly, rotor 95 is contoured to comprise a peripheral surface that is cylindrical on the axis of container 131 which passes through the center of spheroid 126, and is angularly displaceable relatively into and out of coincidence with the axis of shaft 103, as seen in Figs. 14 and 13 respectively. Additionally, the exterior surface of rotor 95 comprises end surfaces that lie in parallel planes, both of which are perpendicular to the axis of the cylindrical surface 159—160, this being the axis of the container 131.

Rotor 95 is contained in shell 162, and rotates interiorly thereof. Shell 162 consists of end plates 163 and 164, with annulus 165 between them, the pieces being assembled and held together by means of bolts 166.

Annulus 165 comprises a cylindrical inside surface 167 that fits the peripheral cylinder 159—160 of container 131, and which constitutes a bearing in which rotor 95 rotates. The distance between end faces of annulus 165 corresponds with the length of rotor 95 between outboard faces of the several outboard panels 132 and 133, and these bear against respective inboard faces 168 and 169 of respective plates 163 and 164 when rotor 95 rotates inside shell 162.

Actuating arm 115 is secured to annulus 165 by means of cap screws 170, Figs. 13, 14 and 15. When arm 115 is actuated as hereinbefore described by pistons 110 and 111, to the positions of either Fig. 13 or Fig. 14, shell 162 carries the container 131 with it, the container rotating on the surface of spheroid 126 and relative to inboard panel 128. By this motion, the angular relationship between opposed faces 138 and 129 of the respective outboard and inboard panels 132 and 128, and opposed faces 130 and 139 of respective inboard and outboard panels 128 and 133, is changed to positions of Figs. 13 and 14 alternatively.

Figure 12:
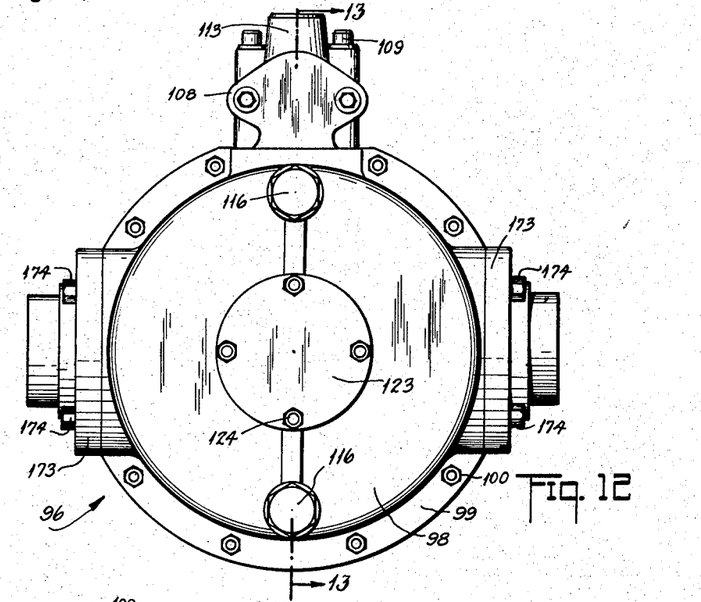
Fig. 12 is an end elevation of a power pump comprising another embodiment of the invention.

As additional support, annulus 165 comprises trunnions 171 and 172. Brackets 173, at the left and right in Figs. 12 and 15, are secured to the housing of half members 97 and 98 by means of cap screws 174, and each contains a bearing for the trunnions 171 and 172 respectively. Shell 162 rotates in bearings 175 by the hereinbefore described actuation of arm 115, and spheroid 126 thereby is relieved of some of the bearing load. Brackets 173 seal the housing of half members 97 and 98 at the bearings 175.

Figure 17:
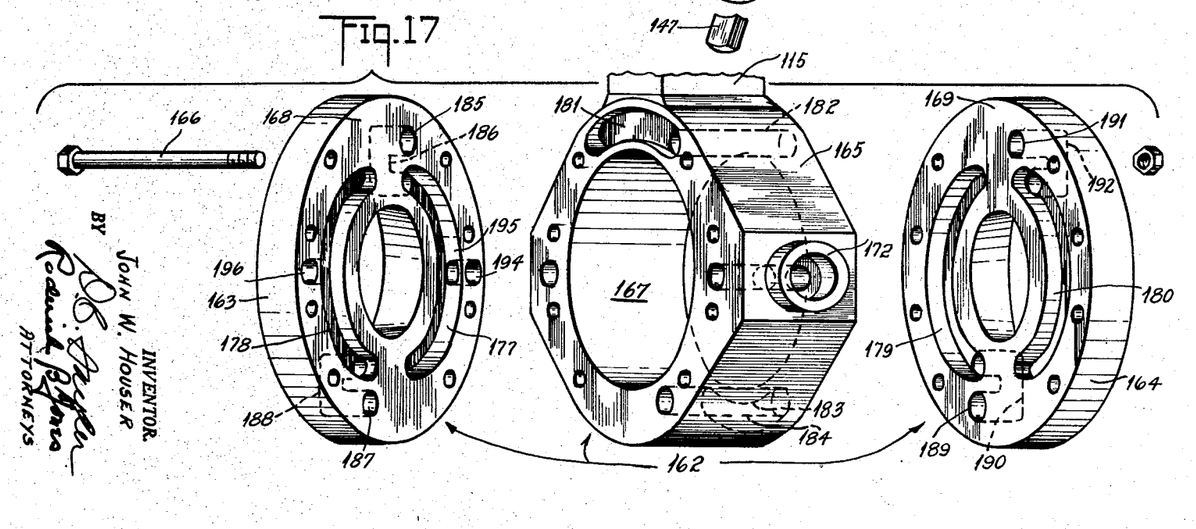
Fig. 17 is an exploded view with parts in perspective, showing the shell.
Figure 18:
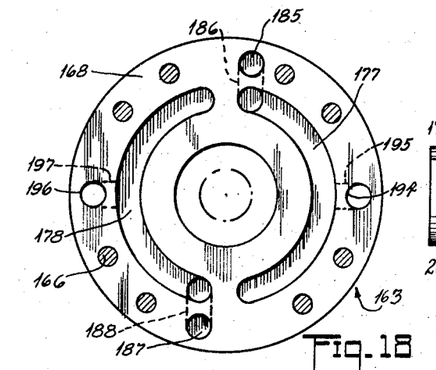
Figs. 18, 19, 20, and 21 show face views of the several parts of the shell.
Figure 21:
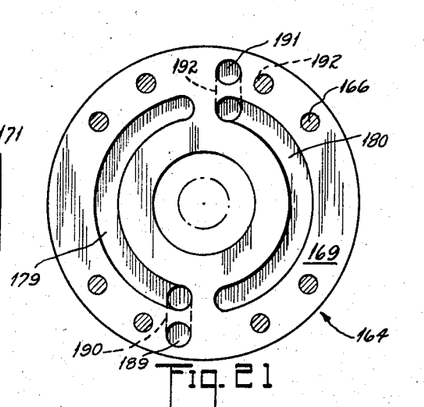
Figure 22:
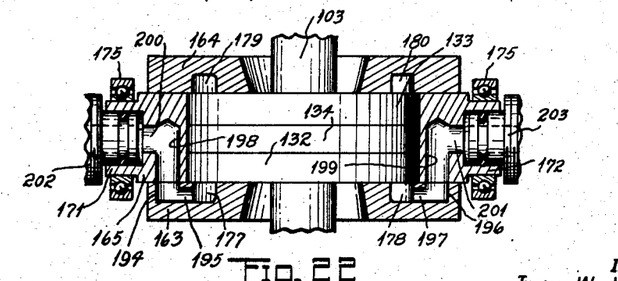
Fig. 22 is a cross-sectional detail, taken on line 22—22 of Fig. 15.

Plate 163 of shell 162 comprises the arcuate channels 177 and 178 on its inboard face, as seen in Figs. 17 and 18, and similar arcuate channels 179 and 180, Figs. 17 and 21, are provided on the inboard face of plate 164. All the arcuate channels 177, 178, 179 and 180, are on a cylinder that is coincident with the cylinder of the several counterbores 158 and concentric with container 131. They are wide enough to span the counterbores 158, and are in registry therewith because of the face-to-face bearing relationship between faces of plates 163 and 164 and panels 132 and 133 respectively.

All the channels 177, 178, 179 and 180 are the same length. In the several plates 163 and 164, channels 177 and 179 respectively are adjacent each other and coextensive circumferentially, and respective channels 178 and 180 similarly are adjacent each other and coextensive. As described hereinbefore with reference to the embodiment of Figs. 1 to 11, the engine of Figs. 12 to 22 also is symmetrical on opposite sides of its center.

In plate 163, arcuate channels 177 and 178 are inlet and outlet ports respectively. Similarly, in plate 164, arcuate channels 179 and 180 are outlet and inlet ports respectively. In shell 162, inlet ports 177 and 180 are diagonally opposite each other for the respective different pump units on respective opposite sides of inboard panel 128, and outlet ports 178 and 179 similarly are diagonally opposite each other. The several pump units are 180° out of phase with each other.

The distances between adjacent ends of arcuate ports 177 and 178 of plate 163 are alike, and are the same as distances between adjacent ends of arcuate ports 179 and 180 of plate 164, which also are alike. The distance between adjacent ends of the ports 177, 178, 179 and 180 severally is governed by the diameter of the counterbores 158, being slightly less to close a counterbore and its companion working chamber when positioned between ports. During rotation of rotor 95, constituting rotation of container 131 inside the shell 162, a given counterbore 158 of panel 32 with reference to plate 163, and the corresponding counterbore 158 of panel 133 with reference to plate 164, are open to ports 177 and 179 respectively as the counterbores travel along their coextensive lengths and until they pass beyond their ends, are closed until they enter registry with ports 178 and 180 respectively to which they then become open, continue to be open to ports 178 and 180 respectively as they travel along their coextensive lengths and until they pass beyond their opposite ends when they become closed, and these counterbores continue to be closed until they again come into registry with ports 177 and 179 respectively and become open thereto.

The time interval when a given counterbore 158 remains closed at a position between adjacent ends of ports 177 and 178 at each of opposite ends thereof, or between ports 179 and 180 at each of opposite ends thereof, is a diminutive portion of a complete revolution of rotor 95, and only long enough to prevent fluid flow through the counterbore as a passage, from the high pressure side of an outlet port 178 or 179 respectively in the two pump units, to the low pressure side of the respective inlet ports 177 and 180.

The two inlet ports 177 and 180 of respective plates 163 and 164 are connected to each other to constitute a container of fluid in common, and the two outlet ports 178 and 179 of respective plates 163 and 164 also are connected to each other similarly to constitute a container of fluid in common.

Figure 19:
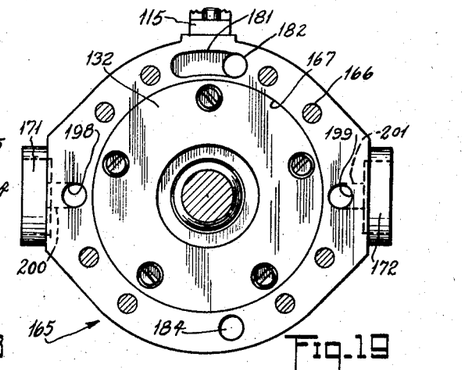
Figure 20:
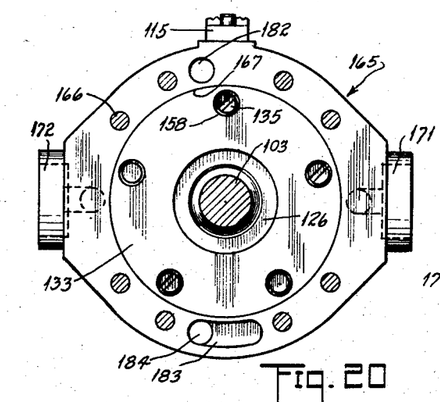

In one of its faces as seen in Figs. 17 and 19, annulus 195 comprises an arcuate channel 181, at one end of which there is a bore 182 through the annulus from face to face. Similarly in the opposite face, as seen in Figs. 17 and 20, annulus 165 comprises an arcuate channel 183, at one end of which there is a bore 184 through the annulus from face to face. Arcuate channels 181 and 183 are located diametrically opposite each other in annulus 165, and lie in a cylinder common to both that is concentric with container 131, and with the cylinder thereof that contains counterbores 158 as also the arcuate ports 177, 178, 179 and 180 of plates 163 and 164, but the diameter of the cylinder of arcuate channels 181 and 183 is somewhat greater. Each arcuate channel 181 and 183 is long enough to span the distance between adjacent ends of arcuate ports 177 and 178 in the case of channel 181, and in the case of channel 183 the arcuate ports 179 and 180 of plate 164.

As seen in Figs. 17 and 18, the inboard face of plate 163 is provided with the bore 185, which coincides with the cylinder of arcuate channels 181 and 183, and which is connected through its back passage 186 with the arcuate port 177 at an end thereof. The same face of plate 163 is provided with bore 187, also coinciding with the cylinder of arcuate channels 181 and 183, and which is connected with arcuate port 178 through its back passage 188. Similarly and as seen in Figs. 17 and 21, the inboard face of plate 164 is provided with the bores 189 and 191 which coincide with the cylinder of arcuate channels 181 and 183, and which connect each with an end of respective arcuate ports 179 and 180 through respective back passages 190 and 192 of ports 189 and 191 respectively.

By tracing out the described structure in Figs. 17 to 21 inclusive, it will be seen that inlet port 177, through its back passage 186 and bore 185 connecting with arcuate channel 181 of annulus 165, connects with the diagonally opposite inlet port 180, through its back passage 192 and bore 191 connecting with face-to-face bore 182 of annulus 165. Similarly, outlet port 178 of plate 163, through its back passage 188 and bore 187 connecting with face-to-face bore 184 of annulus 165, connects with the diagonally opposite arcuate port 179 of plate 164, by the latter being connected with arcuate passage 183 of annulus 165 through its back passage 190 and bore 189.

Bore 194 in the inboard face of plate 163, Fig. 18, connects with inlet port 177 at a point about midway of its length through radially-directed back passage 195. Similarly, and also in the inboard face of plate 163, bore 196 connects with outlet port 178 at a point about midway of its length through radially-directed back passage 197. In the contacting face of annulus 165, and as seen in Fig. 19, bore 198 connects with bore 194 of plate 163, and bore 199 of annulus 165 connects with bore 196 of plate 163. Bores 194 and 196 of plate 163, and respective companion bores 198 and 199 of annulus 165, are located diametrically opposite each other, and respectively connect with respective bores 200 and 201, which are opposite each other and directed radially towards each other in annulus 165, and are located at the centers of respective trunnions 171 and 172. Bores 200 and 201 are intake and exhaust bores respectively.

A pipe connection is threaded into each of the brackets 173, which adapt the power pump to the pipe standard of the system, and these constitute the intake 202 at the left in Fig. 15, and the exhaust 203 at the right. The intake 202 and exhaust 203 connect with the intake and exhaust bores 200 and 201 respectively.

In the engine of the embodiment of Figs. 12 to 22 operating as a power pump, rotor 95 is driven by the drive of shaft 103. When the pressure behind the pistons 110 and 111 is balanced, by operation of a valve, not shown, the parts are positioned as seen in Fig. 14. A simple two-way valve is suitable for the purpose, with "off" and "on" positions, the valve being in "off" position for the adjustment of Fig. 14.

Opposed faces 138 and 129 of respective outboard and inboard panels 132 and 128, and of respective inboard and outboard panels 128 and 133 the opposed faces 130 and 139, are disposed in parallel relationship. The working chambers do not change their volumetric values by rotor 95 being rotated, and the pump of the several pump units does not operate to build up pressure. The pump is out of operation by its valve being in "off" position.

When the valve is turned to "on" position, a pressure differential is set up behind the several pistons 110 and 111, which pressure differential is high behind piston 111. Arm 115 is actuated thereby to the left from its position of Fig. 14 to its position of Fig. 13. This operates to rotate shell 162 in its bearings 175, Fig. 15, carrying with it container 131 rotating on spheroid 126 in the socket of surfaces 136 and 137. Outboard panels 132 and 133 are actuated thereby to displace their respective faces 138 and 139 angularly with reference to their respective opposed faces 129 and 130 on opposite sides of inboard panel 128, the angles of displacement being the same but oppositely directed.

In the two pump units at the left and right respectively of inboard panel 128, working chambers in the phase of increasing volumetric values are traveling along the lengths of inlet ports 177 and 180 as a fluid container in common, respectively of the left and right pump units. They are drawing fluid into their cavities successively, each through its companion counterbore 158, which is supplied by intake 202 through companion bores 198 and 194 respectively of annulus 165 and plate 163, and through radially directed back passage 195 into inlet port 177.

The fluid that is taken into the working chambers in the manner described, is subjected to pressure buildup when the working chambers move in succession each into its phase of diminishing volumetric values, and their corresponding counterbores 158 then are travelling along the lengths of outlet ports 178 and 179, in the respective pump units at the left and right. The pressurized fluid is poured into the outlet ports 178 and 179 as a fluid container in common, from which it is driven through companion bores 196 and 199 of plate 163 and annulus 165 respectively, and through exhaust port 201, to the exhaust 203, which delivers the fluid to the power system that is serviced by the pump.

The structures disclosed in the drawing present several practical embodiments of the invention. The scope of the invention is determined by the accompanying claims.

What is claimed is:

1. In a pressure fluid engine, adjacently located panels with proximate faces of the adjacent panels spaced apart in opposed relationship and with the several panel faces being circular on axes of the respective adjacent panels intersecting at a predetermined angle, the panels being rotatable in unison on their intersecting axes, the engine comprising a container peripherally of the panel faces enclosing the space between the opposed faces and comprising three or more radially disposed partitions extending to the peripheral container and from face to face between the opposed panel faces, the partitions being located at intervals circumferentially of the panel faces to contain working chambers at circumferential intervals between opposed panel faces, the engine producing pressure variations in the circumferentially successive working chambers progressively from minimum to maximum and to minimum pressures in response to volumetric changes resulting from the opposed panel faces rotating in unison in the cycle of a revolution, a pin coincident with each partition positioned with its axis extending radially from the point of intersection between the axes of rotation of the several adjacent panels, a bearing for each pin to rotate on its axis, each bearing coinciding with a panel and comprising a seal around its pin inhibiting fluid leakage through the panel, each pin comprising a lengthwise slot constituting opposite parallel bearing surfaces, and each partition comprising opposite bearing surfaces engaging the respective opposite bearing surfaces of the slot of its corresponding pin.

2. In an engine as defined in claim 1, the face of one of said panels being contoured conical on the axis of rotation of the panel, the conical angle being determined to position opposed faces of adjacent panels closely adjacent to each other and parallel along a radial plane at the circumferential location of minimum volume of the working chambers.

3. In an engine as defined in claim 1, a stator and a rotor rotatable in the stator, the rotor embodying the several adjacent panels and the working chambers thereof, the stator comprising an intake and an exhaust, inlet and outlet ports communicating with the space between the opposed faces of adjacent panels at diametrically opposite intervals in respective zones of increasing and decreasing volumes, and manifold structure embodying passages from the intake to the inlet port and from the exhaust to the outlet port.

4. In an engine as defined in claim 3, each of said adjacent panels comprising an axially directed shaft, the stator comprising a bearing for each shaft and a mechanism operable to actuate one of the bearings transversely of the axis of the other shaft to change the angle between shafts and the angular displacement between the opposed faces of the panels accordingly.

5. In an engine as defined in claim 4, the bearing-actuating mechanism being adjustable to vary the angular displacement between opposed panel faces progressively from parallel relationship corresponding with axial alignment of the several shafts to a maximum angular displacement corresponding with maximum angular displacement between the shafts.

6. In an engine as defined in claim 1, a rotor shaft coaxial with one of the adjacent panels which is secured thereto rigidly, adjacent mechanism operable to swing the other adjacent panel on an axis through the intersection of and perpendicular with a plane common to the axes of both panels to vary the angle of displacement between the several panel faces.

7. In an engine as defined in claim 3, of the adjacent panels one constituting a pair of outboard panels secured rigidly to each other coaxially and spaced apart face-to-face with their inboard faces defining planes that are parallel, and the other of the adjacent panels constituting an inboard panel positioned between the outboard panels with its opposite faces respectively positioned each opposed to the inboard face of that outboard panel on its side of the inboard panel to constitute an engine unit on each of respective opposite sides of the inboard panel.

8. In an engine as defined in claim 7, opposite faces of the inboard panel positioned symmetrically on opposite sides of its center plane, the intersection between the axes of the several adjacent panels coinciding with the center-plane of the inboard panel coincident with a point midway between the inboard faces of the outboard panels.

9. In an engine as defined in claim 8, each of the several partitions extending through the inboard panel from face to face of inboard faces of the several outboard panels, the inboard panel comprising a bearing for each of the several radially directed pins locating the axis of its pin in the center-plane of the inboard panel.

10. In an engine as defined in claim 9, each partition consisting of a rigid piece extending continuously from face to face between inboard faces of respective outboard panels, an attachment securing each partition to the several outboard panels at its respective opposite ends, the attachments permitting relative movement between the outboard panels and partitions which enables freedom of relative circumferential movement between circumferentially alternate partitions.

11. In an engine as defined in claim 9, each partition consisting of corresponding partition members in the respective outboard panels and a corresponding segment extending continuously between corresponding partition members, each partition member projecting rigidly away from the inboard face of its outboard panel and comprising an end face located in a plane common to the end faces of all the partition members of the corresponding outboard panel which is normal to the axis of the panel, each segment comprising end faces at its respective opposite ends bearing in sliding engagement against the end faces of its corresponding partition members to enable relative circumferential movement between segments and their respective corresponding partition members.

12. In an engine as defined in claim 7, each engine unit comprising an inlet port and an outlet port individual to itself, a passage connecting the intake with the several inlet ports, and a passage connecting the several outlet ports with the exhaust.

13. In an engine as defined in claim 8, an assembly of the outboard panels and the peripheral container enclosing the working chambers comprising an exterior cylindrical surface coaxial with the inboard faces of the outboard panels and also exterior flat end faces normal to the axis of the cylinder, a shell comprising interior cylindrical and flat surfaces respectively companion to the exterior cylindrical surface and end faces of the assembly for bearing engagement therewith, the rotor comprising a shaft and the inboard panels secured rigidly to each other coaxially and a spheroid secured rigidly to the inboard panel concentrically with its center-plane, the rotor comprising the assembly embodying a spherical bearing surface companion to the spheroid centered on the axis of its exterior cylindrical bearing surface, the stator comprising bearings for the shaft and mechanism to rotate the shell on the center of the spheroid on an axis at right angles to the axis of the shaft bearings to vary the angular displacement between opposed faces of the inboard and outboard panels of the rotor.

14. In an engine as defined in claim 13, the shell comprising trunnions on an axis intersecting the axis of the interior cylindrical surface at right angles, the stator comprising bearings for the trunnion on an axis intersecting the axis of the shaft bearings at right angles, the shell actuating mechanism rotating the shell on the trunnion bearings.

15. In an engine as defined in claim 13, each engine unit comprising an inlet port and an outlet port individual to itself, the shell embodying a passage connecting the several inlet ports and a passage connecting the several outlet ports.

16. In an engine as defined in claim 13, the shell embodying manifold structure comprising passages connecting the intake with the several inlet ports and passages connecting the exhaust with the several outlet ports.

17. In an engine as defined in claim 14, each engine unit comprising an inlet port and an outlet port individual to itself, the shell embodying manifold structure comprising passages connecting the intake with the several inlet ports and passages connecting the several outlet ports with the exhaust, the intake and the exhaust being located at the centers of the respective trunnions of the shell.

18. In an engine as defined in claim 13, the mechanism for rotating the shell being operable to two positions alternatively of parallel relationship and angular displacement respectively between opposed faces of the several inboard and outboard panels.

References Cited in the file of this patent

UNITED STATES PATENTS

| 15,173 | Carpenter | June 24, 1856 |
| 865,891 | Heberling et al. | Sept. 10, 1907 |
| 2,353,780 | Neuland | July 18, 1944 |
| 2,380,886 | Waldie | July 31, 1945 |
| 2,525,907 | Johnston | Oct. 17, 1950 |
| 2,584,426 | Crane | Feb. 5, 1952 |
| 2,678,003 | Gerken | May 11, 1954 |
| 2,681,046 | Barrett | June 15, 1954 |
| 2,691,348 | Gunther | Oct. 12, 1954 |
| 2,691,349 | Cuny | Oct. 12, 1954 |
| 2,860,828 | Jonassen | Nov. 18, 1958 |